United States Patent [19]
Grandics

[11] Patent Number: 5,998,606
[45] Date of Patent: Dec. 7, 1999

[54] MN(IV)-MEDIATED CROSSLINKING AND FUNCTIONALIZATION OF CHROMATOGRAPHY MEDIA

[76] Inventor: Peter Grandics, 5922 Farnsworth Ct., Carlsbad, Calif. 92008

[21] Appl. No.: 08/968,771

[22] Filed: Nov. 10, 1997

[51] Int. Cl.$^6$ ............ C08B 37/00; C08B 15/10; C08B 37/02
[52] U.S. Cl. ............ 536/123.1; 536/88; 536/106; 536/112; 536/124
[58] Field of Search ............ 536/88, 103, 106, 536/120, 121, 124, 112, 123.1; 210/500.29

[56] References Cited

U.S. PATENT DOCUMENTS

| | | | |
|---|---|---|---|
| 3,042,677 | 7/1962 | Rogers et al. | 260/256.5 |
| 3,208,994 | 9/1965 | Flodin | 260/209 |
| 3,507,851 | 4/1970 | Ghetie et al. | 260/209 |
| 3,860,573 | 1/1975 | Honkanen et al. | 260/209 R |
| 3,959,251 | 5/1976 | Porath et al. | 260/209 R |
| 4,543,363 | 9/1985 | Yanagihara | 521/38 |
| 4,663,163 | 5/1987 | Hou et al. | 424/101 |
| 4,665,164 | 5/1987 | Pernemalm et al. | 536/120 |
| 4,973,683 | 11/1990 | Lindgren | 536/120 |

FOREIGN PATENT DOCUMENTS

| | | |
|---|---|---|
| 02307974 | 12/1990 | Japan. |
| 1026706 | 4/1966 | United Kingdom. |
| 1352613 | 5/1974 | United Kingdom. |
| 97/38018 | 10/1997 | WIPO. |

OTHER PUBLICATIONS

M.S. Kharasch et al., "The Peroxide Effect in . . . Substitution of Bisulfite," J. Org. Chem. 3:175–192(1939) (Exhibit 9).

J. Porath et al., "Agar Derivatives for . . . Bead Form," J. Chromaotgr. 60:167–177 (1971) (Exhibit 10).

J.H. Helberger, "Zur Kenntnis . . . von Propansulton," Liebigs Ann. Chem. 588:71–78 (1954) (Exhibit 11).

*Primary Examiner*—Howard C. Lee
*Attorney, Agent, or Firm*—Oppenheimer Wolff & Donnelly LLP

[57] ABSTRACT

Novel methods are described to synthesize chromatography media. The methods describe a crosslinking procedure utilizing the catalytic effect of $MnO(OH)_2$ in obtaining a very rigid matrix. The mechanism of crosslinking is likely of free-radical type. This is also suggested by the concurrent functionalization steps which are known to be of free-mechanism and are greatly enhanced by $MnO(OH)_2$. The methods are simple and efficient as crosslinking and functionalization of the matrix takes place in the same step. High protein binding capacities are obtained along with an increased efficiency of the matrix. One particularly preferred process according to the present invention comprises: (1) reacting a polymeric carbohydrate matrix with an activating reagent which contains a halogen atom or epoxide and a double bond under alkaline conditions to generate an activated matrix; (2) reacting the activated matrix having double bonds inserted with a reagent or reagents producing $MnO(OH)_2$; and (3) activating the double bond in the presence of $MnO(OH)_2$ to crosslink the matrix and simultaneously derivatize the matrix with a halohydrin, carboxyl or sulfonate group.

39 Claims, 2 Drawing Sheets ial groups that can be activated under a controlled reaction sequence are optimal for increasing the rigidity of agarose gels. One functional group is used to introduce the crosslinker into the agarose matrix via the available hydroxyl groups. The second functional group remains unreactive under the conditions employed to introduce the crosslinker. Then the second functional group of the crosslinker is activated and brought into reaction with an adjacent hydroxyl group thus forming a crosslink between the polysaccharide chains. The repetition of these steps leads to increasing number of crosslinks and increased rigidity of the particle. This is a controlled procedure during which side-reactions are excluded and optimal crosslinking is obtained. When the required rigidity is attained, the particle is suitable to be functionalized with the required groups (affinity, ion exchange, hydrophobic interaction, etc.) to prepare the desired type chromatography gel.

MN(IV)-MEDIATED CROSSLINKING AND FUNCTIONALIZATION OF CHROMATOGRAPHY MEDIA

BACKGROUND

This invention is directed to synthetic procedures for simultaneous crosslinking and functionalization of polysaccharide chromatography media.

Crosslinked polysaccharide media have become very important for chromatographic separations during the past decades. The most important areas for the use of crosslinked polysaccharide media are the separation of biomolecules such as proteins, nucleic acids, and carbohydrates.

Polysaccharide chromatography media are typically macroporous and the porosity is a function of the concentration of polysaccharide used to produce these gel matrices. Typically, the lower the carbohydrate concentration, the bigger the pores are, i.e., the higher the exclusion limit. The size of the pores is critical for the separation. The porous polysaccharide gels are further derivatized with various functionalities such as ion exchange, hydrophobic interaction, or affinity functionalities to effect separation of biomolecules.

The polysaccharide gel matrices are composed of a great number of intertwining polymeric chains that are held together by hydrogen bonding. The polysaccharide chains attain certain fixed distances and form chain-like structures between which the pores are formed. The crosslinking within these structures does not significantly affect the size of the pores, only the rigidity of the particle. The crosslinking of these chains utilizes hydroxyl groups on the polysaccharides and leads to chemically stable particles. Several methods have been published in connection with cellulose (British Patent No. 1,026,706), dextran (U.S. Pat. Nos. 3,042,677 and 3,208,994) and agarose crosslinked with epichlorohydrin (U.S. Pat. No. 3,507,851) and other bifunctional reagents (U.S. Pat. No. 3,860,573). Other bifunctional reagents utilized are divinyl sulfone, bisepoxides, and dicarboxylic acid chlorides (British Patent No. 1,352,613).

Lindgren (U.S. Pat. No. 4,973,683) described the mechanism of conventional crosslinking methods referring to the work of L. Holmberg (Doctoral Thesis, Swedish University of Agricultural Sciences 1983. pp. 28-29). Holmberg has demonstrated that upon crosslinking of polysaccharides with epichlorohydrin the primary mechanism of crosslinking is polymer crosslinking and substitution and very little monomer crosslinking takes place in which only monomer epichlorohydrin participates. This explains why the rigidity of the gel matrix does not increase significantly by this type of crosslinking. To eliminate polymerization of the crosslinker, Lindgren suggested that bifunctional crosslinkers with function Although the methods of Lindgren are useful, they have the drawback that crosslinking and functionalization occur in successive steps. This increases the time required, reduces the overall yield, and increases the possibility of side reactions and other loss of material. Therefore, there is a need for an improved method that can allow simultaneous crosslinking and functionalization of polysaccharide chromatography media.

SUMMARY OF THE INVENTION

Pursuant to this invention new synthesis methods are described to prepare chromatography media in a manganese-mediated simultaneous crosslinking and derivatization procedure. The optimal methods for preparing cation and anion exchange media and their separation characteristics are described. The methods are simple, efficient and produce high capacity and efficiency chromatography media.

In general, a process of simultaneous crosslinking and derivatization of a polymeric carbohydrate matrix according to the present invention comprises the steps of:

(1) reacting a polymeric carbohydrate matrix with an activating reagent which contains a halogen atom or epoxide and a double bond under alkaline conditions to generate an activated matrix having double bonds inserted;

(2) reacting the activated matrix having double bonds inserted with a metallic catalyst that promotes a free-radical reaction; and (3) activating the double bond in the presence of the metallic catalyst to crosslink the matrix and simultaneously derivatize the matrix with a halohydrin, carboxyl or sulfonate group.

Typically, the metallic catalyst contains a metal selected from the group consisting of manganese, nickel, cobalt, iron, and chromium. Preferably, the metallic catalyst contains manganese.

When the metallic catalyst is manganese, the process comprises:

(1) reacting a polymeric carbohydrate matrix with an activating reagent which contains a halogen atom or epoxide and a double bond under alkaline conditions to generate an activated matrix having double bonds inserted;

(2) reacting the activated matrix having double bonds inserted with a reagent or reagents producing $MnO(OH)_2$; and (3) activating the double bond in the presence of $MnO(OH)_2$ to crosslink the matrix and simultaneously derivatize the matrix with a halohydrin, carboxyl or sulfonate group.

The activating reagent can have the formula $X-CH_2-CH=CH_2$ wherein X is a halogen or epoxide group. Alternatively, the activating reagent can be allyl glycidyl ether.

The double bond can be activated with bromine in the presence of $MnO(OH)_2$. Alternatively, the double bond can be activated with sodium bisulfite in the presence of $MnO(OH)_2$. As another alternative, the double bond can be activated with neutral $KMnO_4$ generating $MnO(OH)_2$.

The process can further comprise the step of improving the pressure/flow characteristic of the matrix by reacting the matrix with 2,3-epoxy-1-propanol.

The matrix can comprise a polysaccharide such as agarose, a dextran, or cellulose.

The process can further comprise the step of reacting the matrix with a primary, a secondary, or a tertiary amine. Alternatively, the process can further comprise the step of reacting the matrix with a thiol compound or a hydroxyl compound. The primary, secondary, or tertiary amine, the thiol compound, or the hydroxyl compound can be linked to a hydrophobic ligand so that the process produces a matrix for hydrophobic interaction chromatography.

Another aspect of the present invention is a crosslinked, derivatized, polymeric carbohydrate matrix produced by a process according to the present invention. The polymeric carbohydrate matrix can be a strong cation exchanger or a strong or weak anion exchanger.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
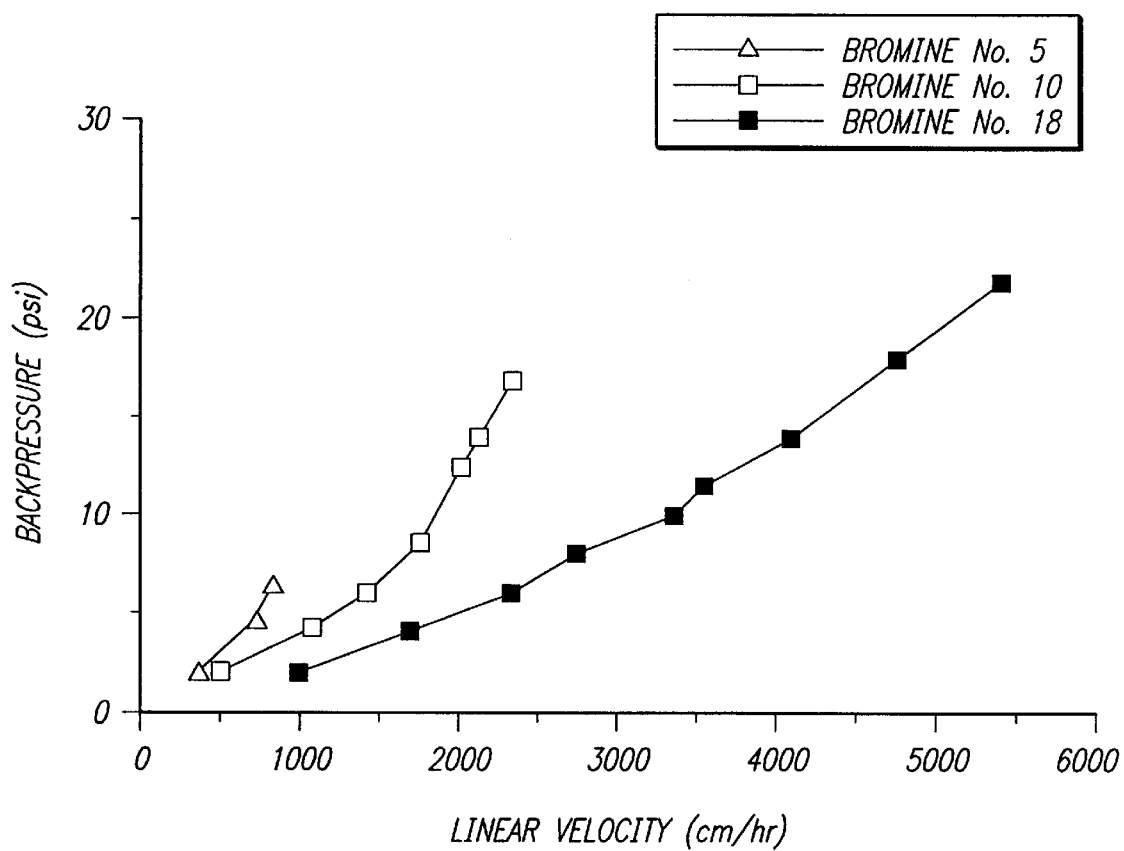
FIG. 1 is a diagram showing the pressure/flow curves of the crosslinked media as a function of the initial allyl group densities characterized by the bromine number as described in the preferred embodiment and the examples.

The subject invention describes novel synthetic procedures which allow simultaneous, highly effective crosslinking and functionalization of polysaccharide chromatography media. The prior art method of Lindgren achieves crosslinking by introducing (i) a compound with a double bond into the agarose chain, (ii) activating the double bond to give halohydrin or epoxide, and (iii) reacting the halohydrin or epoxide under alkaline conditions with hydroxyls on agarose gel to effect crosslinking. More specifically, the activation of double bonds is carried out with the addition of bromic water (bromine) or an N-bromosuccinimide (NBS) to produce an epibromohydrin (halohydrin) functionality which gives rise to an epoxide and forms an ether linkage under alkaline conditions.

We have unexpectedly found that when the bromine addition is carried out in the presence of a manganese compound, $MnO(OH)_2$, both the formation of halohydrin and crosslinking take place simultaneously. The $MnO(OH)_2$ is prepared in situ by mixing $MnCl_2$ with equimolar NaOH first to form $Mn(OH)_2$ which gets spontaneously oxidized by atmospheric oxygen to $MnO(OH)_2$. The reaction is rapid and increased rigidity of the matrix is obtained only in the presence of $MnO(OH)_2$. The crosslinking is completed at the time the addition of bromine is completed. Since the reaction medium is acidic, a crosslinking reaction mechanism following the halohydrin/epoxide route can be excluded. Although Applicant does not intend to be bound by this theory, the postulated mechanism of the $MnO(OH)_2$-mediated crosslinking is of a free-radical type reaction and may involve the formation of a 1,3-diene followed by saturation of the double bonds with bromine. The crosslinking compound having a double bond may be allyl bromide, allyl glycidyl ether, their substituted derivatives or any other allylic or vinylic compound that can be introduced into the matrix via a stable linkage. Besides manganese, nickel, cobalt, iron, and chromium derivatives may be suitable catalysts. However, a preferred catalyst contains manganese.

In general, with a manganese catalyst, a process according to the present invention comprises:

(1) reacting a polymeric carbohydrate matrix with an activating reagent which contains a halogen atom or epoxide and a double bond under alkaline conditions to generate an activated matrix having double bonds inserted;

(2) reacting the activated matrix having double bonds inserted with a reagent or reagents producing $MnO(OH)_2$; and (3) activating the double bond in the presence of $MnO(OH)_2$ to crosslink the matrix and simultaneously derivatize the matrix with a halohydrin, carboxyl or sulfonate group.

The activating reagent can have the formula $X—CH_2—CH=CH_2$ wherein X is a halogen or epoxide group. Alternatively, the activating reagent can have the formula

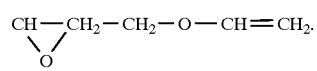

This latter activating reagent is allyl glycidyl ether.

The pressure/flow characteristics of the matrix can be improved by reaction with 2,3-epoxy-1-propanol as detailed below in Example 7. Other epoxylated lower alcohols can be used as an alternative to 2,3-epoxy-1-propanol.

The polymeric carbohydrate matrix can be a polysaccharide such as agarose, cellulose, or dextran. Other polymeric carbohydrates can be used and are known to those of skill in the art. The matrix to be used can be chosen on the basis of stability, suitability for attachment of ligands, and flow characteristics.

The final rigidity of the particle is only the function of the initial density of double bonds (FIG. 1). Therefore the desired particle rigidity can be reached in one step without the need for repeated crosslinking cycles suggested by Lindgren. Also, the synthesis of polysaccharide chromatography media is greatly simplified since crosslinking and derivatization takes place simultaneously.

The crosslinked particles having halohydrin groups can be functionalized with a variety of groups including affinity, ion exchange, or hydrophobic interaction functionalities. The optimal conditions are determined by the nature of the compound to be coupled. The epibromohydrin group is activated by adjusting the pH. For coupling compounds via thiol groups, the typical pH range is 7.5–8.5. Thiol groups form a stable thioether linkage during the reaction. Amino groups react at higher pH, optimally from 9–11, during which a very stable secondary amine linkage is formed. At pH 12, hydroxyl groups will react forming an ether bond. This is the most stable linkage and very resistant to hydrolysis.

For synthesizing anion exchangers the epibromohydrin groups are reacted with a compound containing a tertiary amine moiety such as dimethylaminoethanol or trimethylamine to provide a strong anion exchange matrix, i.e., one containing quaternary amino groups. Other tertiary amino compounds can be used and are known to those skilled in the art. A weak anion exchanger can be obtained using a compound containing a secondary amine moiety such as diethylamine. Other secondary amino compounds can be used. Similarly, a compound containing a primary amine moiety such as ethylamine can be used to produce a weak anion exchanger.

For producing a hydrophobic interaction medium, the epibromohydrin groups can react with a hydrophobic ligand containing amino, thiol or hydroxyl groups under the appropriate pH conditions. For example, stearylamine (Example 10) can be used to introduce a hydrophobic ligand. Other amine derivatives of fatty acid chains can appropriately be used to introduce hydrophobic ligands of different size, according to the length of the fatty acid chain. To immobilize a carbohydrate, e.g., a monosaccharide, or a polysaccharide, such as dextran, or derivatized dextran, the coupling is performed via hydroxyls. The epibromohydrin group may also function as an activated group to immobilize proteins, peptides or nucleic acids via thiol, amino or hydroxyl groups.

We show here that other free-radical type reactions are also facilitated by Mn(IV). The $MnO(OH)_2$-mediated crosslinking and functionalization is particularly convenient for the preparation of cation exchange media. This phenomenon was first noticed during preparation of a carboxylic weak cation exchanger. When a neutral $KMnO_4$ solution at suitable concentration is used to oxidize the double bonds within the gel matrix, carboxylic groups were obtained and, at the same time, the particles became very rigid. Neutral $KMnO_4$ in the reaction is reduced to $MnO(OH)_2$, thus promoting crosslinking likely through an oxygen free-radical mechanism.

Another oxygen free-radical mediated reaction is the addition of bisulfite to allylic compounds which offers a simple way of preparing a sulfonic acid type strong cation exchanger. This method was described by Karasch et al. (J. Org. Chemistry 3, 175, 1939) to achieve conversion of allyl alcohol to 1-hydroxypropane-3-sulfonate. The method was optimized by Helberger (Annalen der Chemie, 588, 71, 1954). The addition reaction is severely inhibited by free-radical scavengers. These methods were applied to our allyl-derivatized agarose particles but the overall yield of sulfonate was low, 10–15%. Also, the rigidity of the particles was not improved by the reaction. However, when $MnO(OH)_2$ was precipitated into the particles prior to addition of bisulfite, the conversion of allyl groups to sulfonate was increased up to 65%. Coincidentally, the rigidity of the particles was greatly enhanced. This allowed the preparation of a strong cation exchanger in a one step reaction.

Figure 2:
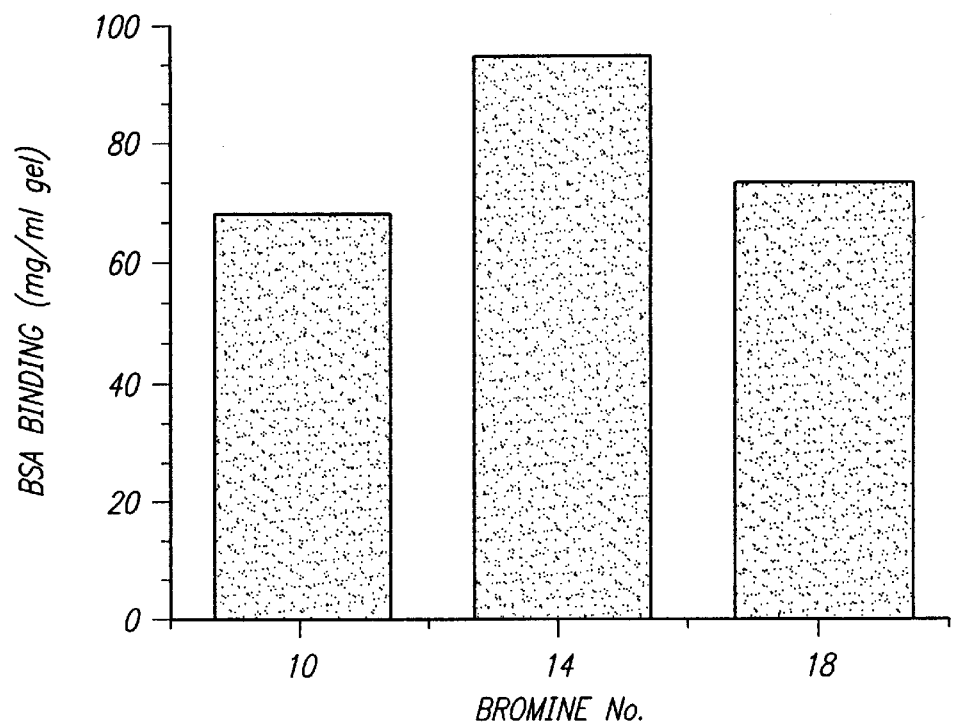
FIG. 2 is a diagram showing the optimal allyl group densities characterized by the bromine number in order to obtain maximal protein binding capacities on a strong anion exchanger.

There are optimal allyl group densities to obtain maximal protein binding capacities for every type of ion exchangers (FIG. 2). The preparation of anion exchangers, both strong and weak, favors a similar level of allyl substitution. The preparation of cation exchangers requires dissimilar allyl group densities with the weak cation exchanger requiring almost twice the level of densities than the strong cation exchanger. This may be due to the fact that $MnO(OH)_2$ is not present in the reaction mixture from the beginning but is being generated as $KMnO_4$ is used up in the oxidation reaction.

Figure 3:
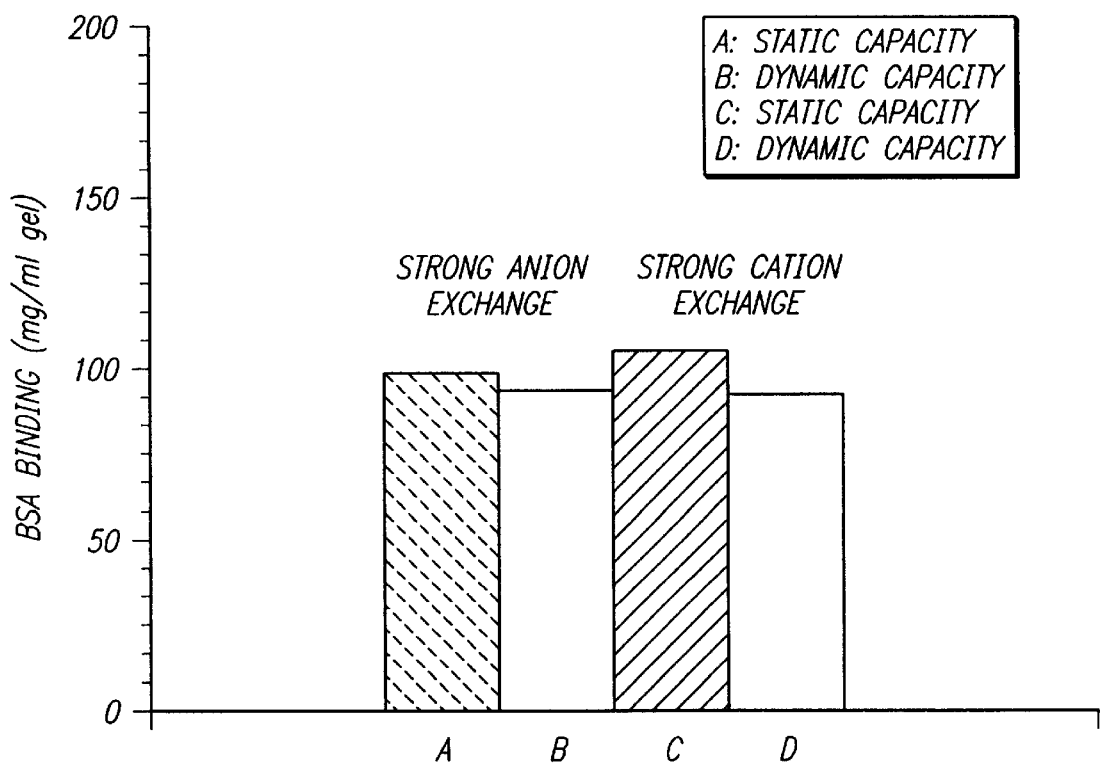
FIG. 3 is a diagram demonstrating static and dynamic protein binding capacities of strong ion exchangers.

When the optimal allyl group densities are used to prepare the respective ion exchangers, high protein binding capacities are obtained (FIG. 3). Both static and dynamic binding tests were performed using bovine serum albumin (BSA). BSA binding capacities exceeded 90 mg/ml for all but the weak anion exchanger tested both in static and dynamic modes. Subsequently, the small ion binding capacities were determined by titration with NaOH for the cation exchangers and HCl for the anion exchangers. The ligand concentration was found to be 0.1 mmol/ml; that is substantially lower than that of other ion exchange media having comparable protein binding capacities. The ligand density for other media typically ranges between 0.18–0.3 mmol/ml. This indicates that the ion exchangers of this invention are significantly more efficient than prior art media.

The novel crosslinking method may also be suitable for the preparation of polymeric particles without the use of bifunctional crosslinkers. In this reaction, the allylic/vinylic side-chains of monomers would be crosslinked by the Mn(IV)-mediated reaction. The crosslinking and functionalization method, besides preparing ion exchangers, allows the preparation of media with other properties, such as metal chelating affinity, thiophilic, or hydrophobic interaction media.

The following Examples illustrate the advantages of the subject invention. These Examples are for illustrative purposes only and are not to be construed as limiting the scope of the invention in any manner. Accordingly, it is to be understood that the description in this disclosure is to facilitate comprehension of the invention and should not be construed to limit the scope thereof as persons skilled in the art can, in light of this disclosure, generate additional embodiments without exceeding the scope or departing from the spirit of the claimed invention.

EXAMPLE 1

To 1 L of 6% uncrosslinked agarose beads, particle size range 60–160 μm, (Sterogene Bioseparations, Inc., Carlsbad, Calif., USA) 1 L of 1M NaOH containing 2 g $NaBH_4$, 5 g KI and 200 ml allyl bromide was added. The reaction mixture was stirred in a closed container at 40° C. until the desired allyl substitution level was reached. The resin was washed with deionized water, alcohol, and finally with deionized water to neutrality.

EXAMPLE 2

To 25 g of microcrystalline cellulose (Whatman, UK) 25 ml water was added followed by 50 ml of 1M NaOH containing 0.1 g $NaBH_4$, 0.25 g KI and 10 ml allyl bromide. The reaction mixture was stirred in a closed container at 40° C. until reaching the desired allyl substitution level. The allylated cellulose was washed with deionized water, alcohol, and finally with deionized water to neutrality.

EXAMPLE 3

The allyl group density of derivatized matrices was determined as follows:

(1) Preparation of the bromine titration reagent: In a 100 ml volumetric flask, 50 ml of bromide/bromate volumetric standard solution, 0.1 N (Aldrich #31869-8) was measured, and made up to 100 ml with 1 M $H_2SO_4$. The combined solutions were mixed gently for 2 min in a closed glass bottle and $OD_{500}$ measured ($OD_{500}$ was 0.75±0.05). The reagent was prepared fresh daily.

(2) Test procedure: One ml of suction-dried allylated matrix was measured and transferred to a screw-cap glass test tube and 1 ml of deionized water added to it. One ml of bromine titration solution was added each time to the resin. The tube was capped and shaken vigorously until the yellow color of bromine turned to colorless. This was continued in 1 ml bromine reagent aliquots until the yellow color remained permanent after 10 min of shaking. The total amount of bromine test solution consumed was recorded and the matrix was qualified based on the ml consumption of bromine reagent, termed bromine number.

EXAMPLE 4

The crosslinking of allylated matrices was carried out as follows: A solution of 10.06 g $MnCl_2$ in 2.4 L deionized water was prepared. The $MnCl_2$ solution was added to 1 L allylated matrix and mixed for 10 min. A solution of 85 ml of 0.1 M NaOH was added to the mixture over a period of 15 min with vigorous stirring. The slurry was stirred at room temperature for 1 hr. The matrix was washed with deionized water to neutrality and then equilibrated with 1 L of 20 mM acetate, pH 5.0, for 10 min. It was then suction-dried and another 1 L of 20 mM acetate, pH 5.0, added. Slowly bromine was added to the slurry with vigorous stirring until a permanent yellow color remained. The excess bromine was removed by adding solid sodium formate. The matrix was washed with deionized water, then saturated $NaHSO_3$ solution added to remove all the dark color. Again, the matrix was extensively washed with deionized water. This procedure yielded a crosslinked matrix that is also functionalized with epibromohydrin groups ready to couple a variety of nucleophilic groups.

EXAMPLE 5

Synthesis of weak anion exchanger: To 1 L of epibromohydrin derivatized matrix (initial bromine number 13-14), 1 L of a 20% solution of diethylamine was added. The slurry was gently mixed in a closed container at room temperature overnight. The matrix was washed with deionized water to neutrality, 1 M NaCl and deionized water, respectively.

EXAMPLE 6

Synthesis of strong anion exchanger: To 1 L of epibromohydrin derivatized matrix (initial bromine number 13-14) a 1 L solution of 20% trimethylamine or 20% dimethylaminoethanol was added. The slurry was gently mixed in a closed container at room temperature overnight. The matrix was washed with deionized water to neutrality, 1 M NaCl and deionized water, respectively.

EXAMPLE 7

Due to the hydrophobicity of the anion exchange groups, there is a need to increase the pressure/flow characteristics of the matrix. The following protocol describes such a method using 2,3-epoxy-1-propanol which increases the hydrophilicity of the matrix, thus improving its pressure/flow characteristics. To 1 L of quaternary amine derivatized matrix, 1 L of 0.2 M NaOH containing 2 g $NaBH_4$ was added followed by the addition of 125 ml of 2,3-epoxy-1-propanol. The slurry was gently mixed at room temperature overnight. The matrix was washed with deionized water to neutrality and tested for pressure/flow characteristics. The treatment had no effect on the protein binding characteristics of the matrix.

EXAMPLE 8

A strong cation exchanger was prepared by converting allyl groups to $R-SO_3H$ groups using $MnO(OH)_2$ and $NaHSO_3$ as follows: An allylated matrix with a bromine number of 9-11 was used. In 3.25 L 40° C. deionized water a solution of 31.5 g $MnCl_2$ was dissolved and mixed for 5 min. Then 1 L allylated matrix was added at 40° C. to the $MnCl_2$ solution and mixed for 15 min. A solution of 1.33 L 0.3 M NaOH was pumped in over a period of 30 min with vigorous stirring. The slurry was stirred at 40° C. for an additional 45 min. Then it was cooled to room temperature and 1 kg $NaHSO_3$ was added and mixed for 15 min. The matrix was washed with deionized water, 1M HCl, and deionized water to neutrality. Finally, it was agitated with 0.1 M EDTA, pH 10, overnight and then washed with deionized water to neutrality. The protein binding capacity was assayed by the BSA binding test and pressure/flow characteristics tested.

EXAMPLE 9

A weak cation exchanger was prepared by converting allyl groups to R-COOH groups using $KMnO_4$ as follows: An allylated matrix with a bromine number of 17-18 was used. A solution of 4.25 g $KMnO_4$ in 2.1 L deionized water was prepared at 40° C. The permanganate dissolved slowly and occasional stirring was required to effect dissolution. The $KMnO_4$ solution was added at 40° C. in 210 ml portions to 500 ml allylated matrix over a period of 10 min with vigorous stirring. The mixture was stirred at 40° C. for an additional 35 min. Then, 500 g $NaHSO_3$ was added to the reaction and kept mixing until the dark color turned to colorless. The matrix was washed with deionized water, then agitated with 0.1M EDTA, pH 10, overnight, and washed profusely with deionized water. The protein binding capacity was assayed by the BSA binding test and pressure/flow characteristics tested.

EXAMPLE 10

Synthesis of a hydrophobic interaction medium. One L of epibromohydrin derivatized matrix (initial bromine number 13-14) was washed with 1 L dry ethanol three times. Stearylamine, 270 g, was dissolved in 1 L ethanol with gentle warming and added to the resin. The slurry was mixed in a closed container at room temperature for 24 h. The matrix was suction-dried and agitated with 2 L of acetone overnight followed by a wash with 3 L of ethanol and ample deionized water.

EXAMPLE 11

The static BSA binding test for cation exchangers was performed as follows: One ml of suction dried matrix was measured and 5 ml of 1 M HCl was added and mixed gently for 10 min. After 10 min, the matrix was suction-dried and washed with deionized water to neutrality. To the matrix, 5 ml of 1M NaCl was added and mixed gently for 10 min. Then the matrix was suction-dried and washed with deionized water to neutrality.

The matrix was subsequently equilibrated with 20 mM sodium citrate, pH 4.3, by mixing with the buffer for 10 min, then adding another portion of the buffer with mixing for 5 min, followed by adding another portion of buffer for another 5 min mixing. The pH and conductivity of the last spent buffer was checked to make sure equilibration was achieved. The BSA solution was dialyzed into the equilibration buffer.

A BSA solution containing 200 mg aliquot of the protein was added to the equilibrated matrix and mixed gently for 10 min. The resin was washed with 20 mM citrate, pH 4.3, buffer until all unbound protein was removed. The combined flowthrough and wash was tested for absorbance at 280 nm. The matrix was eluted with 50 mM Tris-0.5 M NaCl, pH 8.5, by gentle mixing. The eluent was tested for absorbance at 280 nm.

EXAMPLE 12

The static BSA binding test for anion exchangers was performed as follows: One ml of suction dried matrix was measured and 5 ml of 0.1 M NaOH was added and mixed gently for 10 min. After 10 min the matrix was suction-dried and washed with deionized water to neutrality. To the matrix 5 ml of 1M NaCl was added and mixed gently for 10 min. Then the matrix was suction-dried and washed with deionized water to neutrality.

The matrix was equilibrated with 50 mM Tris, pH 8.5, by mixing with the buffer for 10 min, then adding another portion of the buffer with mixing for 5 min, followed by adding another portion of buffer with mixing for 5 min. The pH and conductivity of the last spent buffer was checked to make sure that equilibration was reached. A BSA solution containing 200 mg aliquot of the protein was equilibrated with the starting buffer, and added to the buffer-equilibrated matrix with gentle mixing for 10 min. The resin was washed with 50 mM Tris, pH 8.5, until all the unbound protein was removed. The combined flowthrough and wash was tested for absorbance at 280 nm. The matrix was eluted with 50 mM Tris-0.5 M NaCl, pH 8.5, by gentle mixing. The eluent was tested for absorbance at 280 nm.

EXAMPLE 13

The dynamic binding capacity of the ion exchange media was determined as follows: A 9 ml bed volume column (1.5×5 cm) was packed with the appropriate exchanger equilibrated with the buffers described in Examples 11 and 12. A BSA solution (10 mg/ml) was pumped into the column at 100 cm/h linear velocity and its volume was measured when 10% breakthrough was observed in the column effluent. The dynamic binding capacity of the ion exchangers only slightly differed from the static capacity (FIG. 3).

EXAMPLE 14

The pressure/flow characteristics of the crosslinked and derivatized matrices were tested as follows:

A column of 1.5×5 cm of the respective media was packed from a 50% slurry and deionized water was pumped through the column bed via a peristaltic pump. The backpressure on the column was recorded at selected flow rates and plotted. The media tested exhibited no compression of the gel bed even at maximal column backpressures. In the column backpressure range of 10–20 psi, the media exhibited linear velocities of 4,000–6,000 cm/h.

ADVANTAGES OF THE INVENTION

The present invention provides a rapid, efficient, and versatile process for simultaneous crosslinking and derivatization of a polymeric carbohydrate matrix such as used in affinity chromatography, gel exclusion chromatography, ion exchange chromatography, and other chromatographic methods. The process of the present invention decreases the time required for reaction, increases the overall yield, and reduces the possibility of side reactions and other loss of material. It can be used to prepare anion and cation exchangers and affinity media as well as hydrophobic interaction chromatography media.

Although the present invention has been described in considerable detail, with reference to certain preferred versions thereof, other versions and embodiments are possible. Accordingly, the concept and scope of the invention is not limited to the specific reagents but certain changes and modifications may be practical within the scope of the appended claims. Therefore, the scope of the invention is determined by the following claims.

I claim:

1. A process of simultaneous crosslinking and functionalization of a polymeric carbohydrate matrix comprising the steps of:
   (a) reacting a polymeric carbohydrate matrix with an activating reagent which contains a halogen atom or epoxide at a double bond under alkaline conditions to generate an activated matrix having double bonds inserted;
   (b) reacting the activated matrix having double bonds inserted with a metallic catalyst that promotes a free-radical reaction; and
   (c) activating the double bonds in the presence of the metallic catalyst to crosslink the matrix and simultaneously functionalize the matrix with a halohydrin, carboxyl or sulfonate group.

2. The process of claim 1 wherein the metallic catalyst contains a metal selected from the group consisting of manganese, nickel, cobalt, iron, and chromium.

3. The process of claim 2 wherein the metallic catalyst is manganese.

4. A process of simultaneous crosslinking and functionalization of a polymeric carbohydrate matrix comprising the steps of:
   (a) reacting a polymeric carbohydrate matrix with an activating reagent which contains a halogen atom or epoxide and a double bond under alkaline conditions to generate an activated matrix having double bonds inserted;
   (b) reacting the activated matrix having double bonds inserted with a reagent or reagents producing $MnO(OH)_2$;
   (c) activating the double bonds in the presence of $MnO(OH)_2$ to crosslink the matrix and simultaneously functionalize the matrix with a halohydrin, carboxyl, or sulfonate group.

5. The process of claim 4 wherein the activating reagent has the formula $X—CH_2—CH=CH_2$ wherein X is a halogen or epoxide group.

6. The process of claim 4 wherein the activating reagent has the formula:

$$CH \underset{O}{\overset{}{\diagdown\diagup}} CH_2 - CH_2 - O - CH = CH_2.$$

7. The process of claim 4 wherein the double bond is activated with bromine in the presence of $MnO(OH)_2$.

8. The process of claim 4 wherein the double bond is activated with sodium bisulfite in the presence of $MnO(OH)_2$.

9. The process of claim 4 wherein the double bond is activated with neutral $KMnO_4$ generating $MnO(OH)_2$.

10. The process of claim 8 further comprising the step of improving the pressure/flow characteristic of the matrix by reacting the matrix with 2,3-epoxy-1-propanol.

11. The process of claim 9 further comprising the step of improving the pressure/flow characteristic of the matrix by reacting the matrix with 2,3-epoxy-1-propanol.

12. The process of claim 4 wherein the matrix comprises a polysaccharide.

13. A process of simultaneous crosslinking and functionalization of a polymeric carbohydrate matrix, where the matrix comprises agarose, comprising the steps of:

(a) reacting an agarose matrix with an activating reagent which contains a halogen atom or epoxide and a double bond under alkaline conditions to generate an activated agarose matrix having double bonds inserted;

(b) reacting the activated agarose matrix having double bonds inserted with a reagent or reagent producing $MnO(OH)_2$; and (c) activating the double bonds in the presence of $MnO(OH)_2$ to crosslink the agarose matrix and simultaneously functionalize the agarose matrix with a halohydrin, carboxyl, or sulfonate group.

14. A process of simultaneous crosslinking and functionalization of a polymeric carbohydrate matrix, wherein the matrix comprises cellulose, comprising the steps of:

(a) reacting a cellulose matrix with an activating reagent which contains a halogen atom or epoxide and a double bond under alkaline conditions to generate an activated cellulose matrix having double bonds inserted;

(b) the activated cellulose matrix having double bonds inserted with a reagent or reagents producing $MnO(OH)_s$; and (c) activating the double bonds in the presence of $MnO(OH)_2$ to crosslink the cellulose matrix and simultaneously functionalize the cellulose matrix with a halohydrin, carboxyl or sulfonate group.

15. A process of simultaneous crosslinking and functionalization of a polymeric carbohydrate matrix, wherein the matrix comprises dextran, comprising the steps of:

(a) reacting a dextran matrix with an activating reagent which contains a halogen atom or epoxide and a double bond under alkaline conditions to generate an activated dextran matrix having double bonds inserted;

(b) reacting activated dextran matrix having double bonds inserted with a reagent or reagents producing $MnO(OH)_2$; and (c) activating the double bonds in the presence of $MnO(OH)_2$ to crosslink the dextran matrix and simultaneously functionalize the dextran matrix with a halohydrin, carboxyl, or sulfonate group.

16. The process of claim 7 further comprising the step of reacting the matrix with a primary, a secondary, or a tertiary amine.

17. The process of claim 16 wherein the primary, secondary or tertiary amine is linked to a hydrophobic ligand so that the process produces a matrix for hydrophobic interaction chromatography.

18. The process of claim 7 further comprising the step of reacting the matrix with a thiol compound.

19. The process of claim 18 wherein the thiol compound is linked to a hydrophobic ligand so that the process produces a matrix for hydrophobic interaction chromatography.

20. The process of claim 7 further comprising the step of reacting the matrix with a hydroxylic compound.

21. The process of claim 20 wherein the hydroxylic compound is linked to a hydrophobic ligand so that the process produces a matrix for hydrophobic interaction chromatography.

22. A crosslinked, functionalized, polymeric carbohydrate matrix produced by the process of claim 1, wherein the polymeric carbohydrate matrix has a small ion binding capacity of less than about 0.15 mmol/ml as determined by titration.

23. A crosslinked, functionalized, polymeric carbohydrate matrix produced by the process of claim 4, wherein the polymeric carbohydrate matrix has a small ion binding capacity of less than about 0.15 mmol/ml as determined by titration.

24. A crosslinked, functionalized, polymeric carbohydrate matrix produced by the process of claim 7, wherein the polymeric carbohydrate matrix has a small ion binding capacity of less than about 0.15 mmol/ml as determined by titration.

25. A crosslinked, functionalized, polymeric carbohydrate matrix produced by the process of claim 8, wherein the polymeric carbohydrate matrix has a small ion binding capacity of less than about 0.15 mmol/ml as determined by titration.

26. A crosslinked, functionalized, polymeric carbohydrate matrix produced by the process of claim 9, wherein the polymeric carbohydrate matrix has a small ion binding capacity of less than about 0.15 mmol/ml as determined by titration.

27. A crosslinked, functionalized, polymeric carbohydrate matrix produced by the process of claim 10, wherein the polymeric carbohydrate matrix has a small ion binding capacity of less than about 0.15 mmol/ml as determined by titration.

28. A crosslinked, functionalized, polymeric carbohydrate matrix produced by the process of claim 11, wherein the polymeric carbohydrate matrix has a small ion binding capacity of less than about 0.15 mmol/ml as determined by titration.

29. A crosslinked, functionalized, polymeric carbohydrate matrix produced by the process of claim 16, wherein the polymeric carbohydrate matrix has a small ion binding capacity of less than about 0.15 mmol/ml as determined by titration.

30. A crosslinked, functionalized, polymeric carbohydrate matrix produced by the process of claim 17, wherein the polymeric carbohydrate matrix has a small ion binding capacity of less than about 0.15 mmol/ml as determined by titration.

31. A crosslinked, functionalized, polymeric carbohydrate matrix produced by the process of claim 18, wherein the polymeric carbohydrate matrix has a small ion binding capacity of less than about 0.15 mmol/ml as determined by titration.

32. A crosslinked, functionalized, polymeric carbohydrate matrix produced by the process of claim 19, wherein the polymeric carbohydrate matrix has a small ion binding capacity of less than about 0.15 mmol/ml as determined by titration.

33. A crosslinked, functionalized, polymeric carbohydrate matrix produced by the process of claim 20, wherein the polymeric carbohydrate matrix has a small ion binding capacity of less than about 0.15 mmol/ml as determined by titration.

34. A crosslinked, functionalized, polymeric carbohydrate matrix produced by the process of claim 21, wherein the polymeric carbohydrate matrix has a small ion binding capacity of less than about 0.15 mmol/ml as determined by titration.

35. A crosslinked, functionalized, polymeric carbohydrate matrix of claim 23 that is a strong cation exchanger, wherein the polymeric carbohydrate matrix has a small ion binding capacity of less than about 0.15 mmol/ml as determined by titration.

36. A crosslinked, functionalized, polymeric carbohydrate matrix of claim 23 that is a strong anion exchanger, wherein the polymeric carbohydrate matrix has a small ion binding capacity of less than about 0.15 mmol/ml as determined by titration.

37. A crosslinked, functionalized, polymeric carbohydrate matrix of claim 23 that is a weak anion exchanger, wherein the polymeric carbohydrate matrix has a small ion binding capacity of less than about 0.15 mmol/ml as determined by titration.

38. The process of claim 4 wherein the matrix comprises a polysaccharide having at least one characteristics selected from the group consisting of stability, suitability for attachment of ligands, and flow characteristics that is substantially similar to the corresponding characteristic of at least one of agarose, cellulosa, or dextran.

39. The process of claim 4 wherein the matrix comprises a polysaccharide having the characteristics of stability, suitability for attachment of ligands and flow characteristics all substantially equivalent to the corresponding characteristics of least one of agarose, cellulose or dextran.

* * * * *